United States Patent [19]

Podlipnik

[11] Patent Number: 4,687,050

[45] Date of Patent: Aug. 18, 1987

[54] DUAL THERMOSTAT CONTROLLED OUTLETS

[76] Inventor: Kalman Podlipnik, 7911 Kennedy Blvd., North Bergen, N.J. 07047

[21] Appl. No.: 787,085

[22] Filed: Oct. 15, 1985

[51] Int. Cl.$^4$ .................. F25B 29/00; G05D 23/00
[52] U.S. Cl. ..................................... 165/27; 236/1 C
[58] Field of Search ............... 165/26, 27, 28, 11 R; 236/1 C; 307/39

[56] References Cited

U.S. PATENT DOCUMENTS

| | | | |
|---|---|---|---|
| 2,120,488 | 6/1938 | Crago | 236/1 C |
| 2,195,954 | 4/1940 | Fields | 236/1 C |
| 2,455,320 | 11/1948 | Stephens | 165/28 |
| 2,547,657 | 4/1951 | Olsen | 165/28 |
| 2,978,228 | 4/1961 | Carlson | 165/27 |
| 3,047,273 | 7/1962 | Scarr, Jr. | 165/26 |
| 3,261,397 | 7/1966 | Hay | 165/27 |
| 3,785,165 | 1/1974 | Valenzuela, Jr. | 62/158 |
| 3,993,120 | 11/1976 | Iberg et al. | 236/1 C |
| 4,270,597 | 6/1981 | Denny | 165/27 |
| 4,335,320 | 6/1982 | Garver | 165/28 |

Primary Examiner—William R. Cline
Assistant Examiner—John K. Ford
Attorney, Agent, or Firm—Arthur L. Plevy

[57] ABSTRACT

A housing contains two thermostats which thermostats are interwired so as to enable one thermostat to control a heating operation and the other thermostat to control a cooling operation. The housing contains at least one AC power receptacle coupled to the heating thermostat and one AC power receptacle coupled to the cooling thermostat. In this manner a heater would be plugged into the one receptacle while an air conditioner would be plugged into the other receptacle. The individual thermostats would be set for a temperature heating range being the difference between the settings. The wiring between the thermostats causes the heating thermostat to come on when the temperature falls below the values set. This in turn causes the plugged in heater to operate. When the temperature is above a value set by the heating thermostat, the unit removes power from all AC receptacles. As soon as the temperature rises above a value set by the cooling thermostat, the cooling thermostat causes the associated AC receptacle to be energized thus turning on the air conditioner. The air conditioner will remain on until the temperature falls below the setting, and at this condition, both the heating unit and the air conditioning unit will be off. As soon as the temperature falls below the value set by the heating thermostat, the heater is again turned on. This series of operations continues maintaining the room at a comfortable temperature within a very narrow range which range may be for example between 4 to 10 degrees depending upon the accuracy of the thermostats.

14 Claims, 5 Drawing Figures

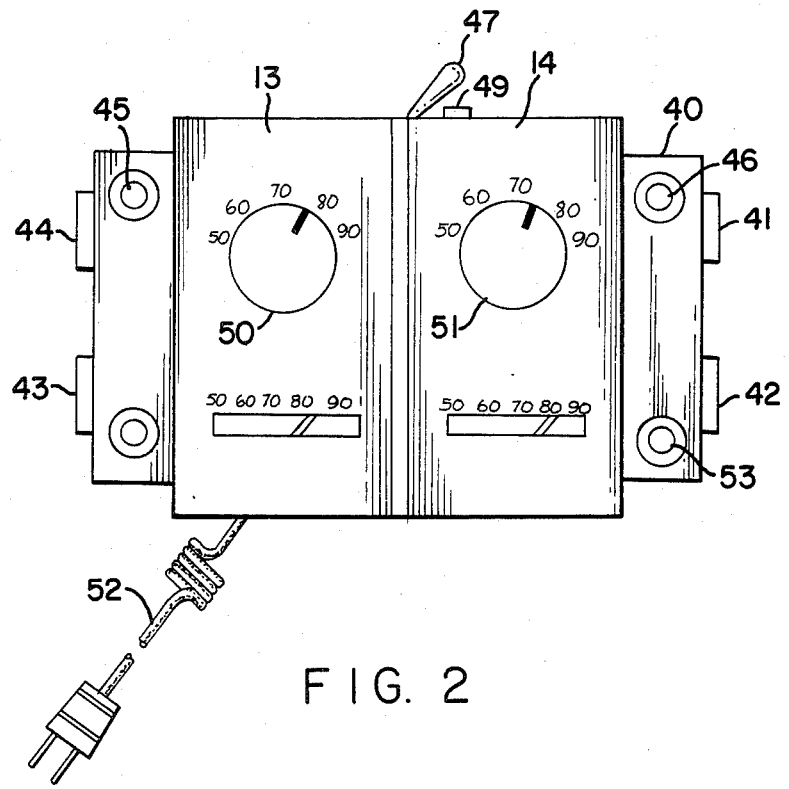
FIG. 2
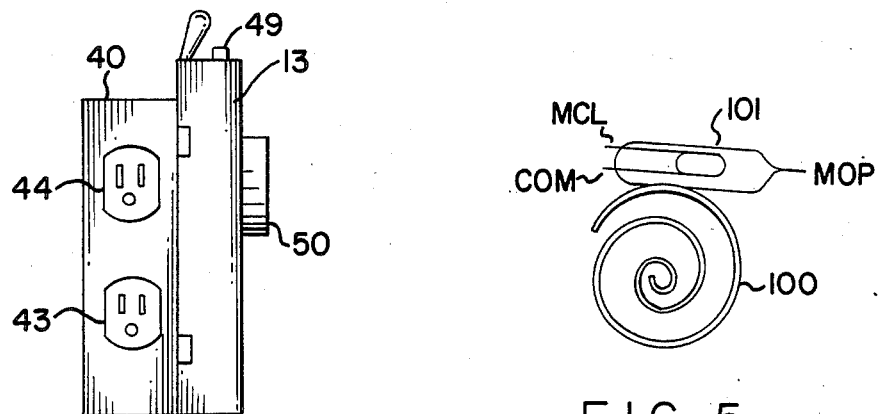
FIG. 3
FIG. 5

DUAL THERMOSTAT CONTROLLED OUTLETS

BACKGROUND OF THE INVENTION

This invention relates to thermostatically controlled outlets and more particularly to a dual thermostat controlled outlet capable of controlling both heating and air conditioning units.

Essentially, as will be explained, there are many facilities which can utilize both air conditioning and heating units for all seasons. These typical units may be wall-mounted, floor-mounted or window-mounted units. The units usually have their own thermostat controls, and the thermostats associated with the units monitor the temperature at the location of the unit which temperature can widely vary in other parts of the room. This aspect was known in the prior art and reference is made to U.S. Pat. No. 3,785,165 which issued on Jan. 15, 1974 and which patent shows a thermostatic control whereby a thermostat controls a relay to enable power to be applied to an air conditioner or other unit which may contain its own thermostat.

The main objective of this patent is to locate the thermostat remote from the plug-in box, and therefore the thermostat can be placed in any part of the room. The patent describes such a system which is relatively simple and enables one to operate a unit which is plugged into the housing associated with the thermostat to conrol the room temperature based on the location of the thermostat. The thermostatic switch in the patent closes to complete the circuit and therefore operate the unit as indicated.

The above cited reference, while using the concept of a remote thermostat to control an air conditioner or other device is extremely limited in application. As one can ascertain, due to constraints of modern society there is an extreme desire to save energy and to still allow a business or a residential facility to operate in a comfortable environment.

In particular, there are small businesses like machine shops and other such facilities where the rooms or environment must be kept dust free with comfortable temperature control. The apparatus to be described is capable of controlling multiple devices such as heating and devices whereby the thermostat being remotely located from the units can be placed in a position which will afford a comfortable operating environment.

Based on the dual control, certain types of machinery such as evaporator fans can be turned on automatically before condensing units start up, and essentially the apparatus, as will be described, has multiple uses in multiple applications. The apparatus has multiple AC outlets into which various units can be plugged and controlled by means of two thermostats which are mounted on a common housing and which can be separately controlled. For example, one thermostat controlling a low temperature relating to a cool condition of the enviroment while the other thermostat can be set to control a higher temperature relating to a heated condition of the environment.

The thermostat control circuits are interwired so that the heating unit cannot be on at the same time the air conditioning unit is on and vice versa. In this manner, based on dual control aspects, the unit has the ability to separately control individual units so that a proper operating environment can be established which therefore assures that the user can save energy by the use of the device with a savings in cost. The device, as indicated, has many uses in regard to small businesses and home environments and is especially useful for operations that exist in tool rooms and inspection rooms where wide temperature changes can be extremely critical because of the fact that precision work pieces will react to temperature changes and change dimensions.

The dual thermostat controlled outlet unit, as will be described, therefore enables one to achieve extremely accurate control of room temperature. As will be explained, the device has many other uses which will become apparent upon reading the specification.

BRIEF DESCRIPTION OF THE PREFERRED EMBODIMENT

A thermostat controlled apparatus, comprising first and second thermostat units each having a separate adjustable temperature setting and each including switching means responsive to said temperature setting to provide a connection between a common terminal and a first terminal for a temperature below said setting and a second terminal for providing a connection between said common terminal and a second terminal for a temperature above said setting, with said first and second thermostats adjusted to a given different temperature indicative of a range of operating conditions, means for supplying a source of energizing potential to said terminals with said terminals of said thermostats connected to another so that energizing potential is available only at one terminal of either thermostat for a temperature above or below said range, first means coupled to said one terminal of said first thermostat to apply said energizing potential to said first means for temperatures below said range, second means coupled to said one terminal of said second thermostat to apply said energizing potential to said second means for temperatures above said range, and further including means coupled to said thermostat terminals to remove energizing potential from both terminals for temperatures within said range.

BRIEF DESCRIPTION OF THE DRAWINGS

FIG. 2 is a top plan veiw of an embodiment of a dual thermostat control unit according to this invention.

FIG. 3 is a side view of the unit of FIG. 2.

FIG. 5 is a simple plan view of a typical thermostat control as may be employed with this invention.

DETAILED DESCRIPTION OF THE DRAWINGS

Figure 1:
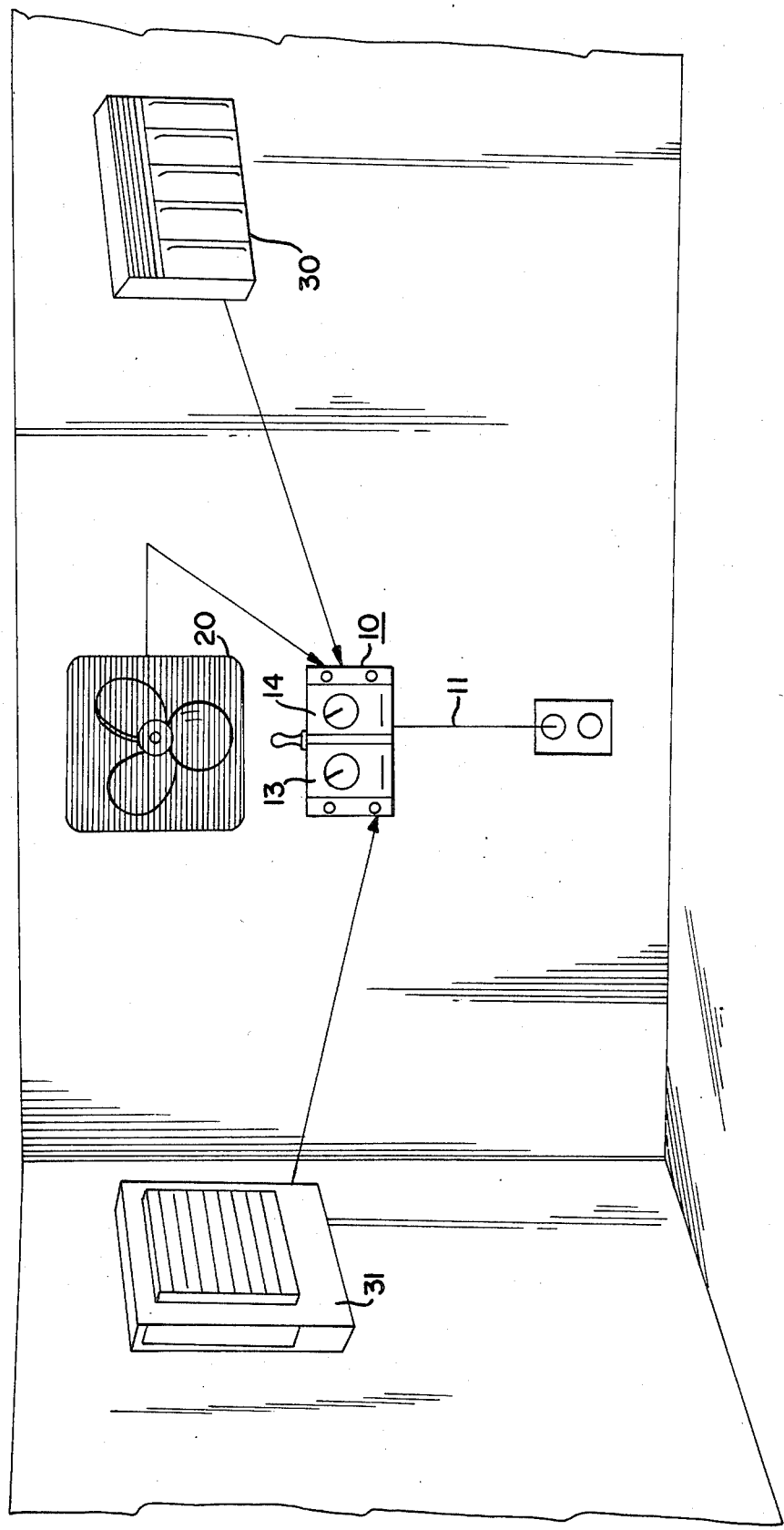
FIG. 1 is a plan veiw of an embodiment of a dual thermostat control unit necessary to show system operation.

Referring to FIG. 1, there is shown a dual thermostat controlled apparatus 10 according to this invention.

Essentially, as will be explained, the apparatus is capable of being plugged into a normal AC outlet via a line cord 11. The appartus contains a suitable housing upon which is mounted two separate thermostat units 13 and 14. Each unit is a conventional and commercially available thermostat and is available from many sources. A typical example of a thermostat which is useful with this invention is manufactured by the Dayton Company and is a line voltage thermostat comprising a single-pole double-throw action and capable of operating at 115 volts AC and controlling up to 2,200 watts of power. Other types of thermostats are suitable as well.

Each thermostat is associated with a separate control knob to enable a user to set the temperature as desired. Such thermostats as well as controls for the thermostats are well known as indicated above. The housing which includes the thermostats 13 and 14 also contains multiple AC female receptacles which receptacles, as will be explained, are controlled by the thermostat circuitry. In this manner, power is selectively applied to the various receptacles according to the setting of each individual thermostat. These settings, as will be explained, enables a user to control a low and a high temperature and to operate multiple devices. Additionally, while not shown, unswitched convenience outlets may also be provided on the housing.

As can be seen from FIG. 1, a unit 20 which may be a fan or an electronic air cleaner or filter is plugged into one AC recptacle associated with the control unit 10. A further unit as 30 which may be an air conditioning unit is also plugged into a corresponding AC receptacle and as will be explained is controlled thereby. A further AC receptacle accommodates a unit 31 which for example may be an electric wall heater or an electric floor heater. The dual thermostat control according to this invention will therefore selectively control the air conditioner or the electronic air cleaner as well as the heater while further assuring that the air conditioner will not operate when the heater is on and vice versa.

This thereby enables one to gain extremely accurate control of both the high and the low temperature. The unit 10 can be positioned in any convenient place in a room and is coupled to an AC wall socket or plug by means of a line cord 11.

Referring to FIG. 2, there is shown a top plan view of an embodiment of the dual thermostat control apparatus such as depicted in FIG. 1. Essentially, the unit contains two commercially available thermostat units as is 13 and 14. Each unit, as indicated, is commercially available, and such units are manufactured by many entities. A suitable example of such a unit, as indicated above, is manufactured by the Dayton Company. These units are referred as line voltage thermostats, and as indicated incorporate a single-pole double-throw action switch and are capable of operating with conventional AC line voltage as 115 volts AC and can control up to 2,200 watts of power.

Each unit, as 13 and 14, is associated with a separate control knob as 50 and 51 which knob can be adjusted to define a particular temperature range. The units are also associated with a temperature indicator to give one a visual indication of the temperature that the particular thermostat is being subjected to. Also contained upon the housing 40 are indicator lamps as 45, 46 and 53. As will be explained, these indicator lamps serve to notify the consumer of the mode of operation of the control apparatus. For example, lamp 45 will indicate when the unit is operating in the heating mode while lamp 53 indicates when the unit is operating in the heating mode. Lamp 46 indicates that neither heating nor cooling is presently occurring.

There is a further lamp designated as 49 which will illuminate when the unit is in the ON condition. The ON condition of the unit is determined by a toggle switch 47 which will control the ON OFF status of the unit. The housing 40 is also associated with an AC male receptacle coupled to a line cord 52. This receptacle is adapted to plug into any convenient AC wall outlet. As can be seen from FIG. 2, and as will be explained subsequently, the unit contains separate AC female connectors as 41, 42, 43 and 44. These connectors are used to accommodate male receptacles which are associated for example with separate air conditioning or heating units as shown in FIG. 1.

Thus the receptacles as 41 to 44 allow such a unit to be plugged into the thermostat control unit 40.

FIG. 3 depicts a side view to clearly show the mounting of the thermostat unit 48 and the two receptacles 43 and 44 which as can be seen will accommodate any conventional AC operated unit such as an air conditioning unit or a heating unit.

Figure 4:
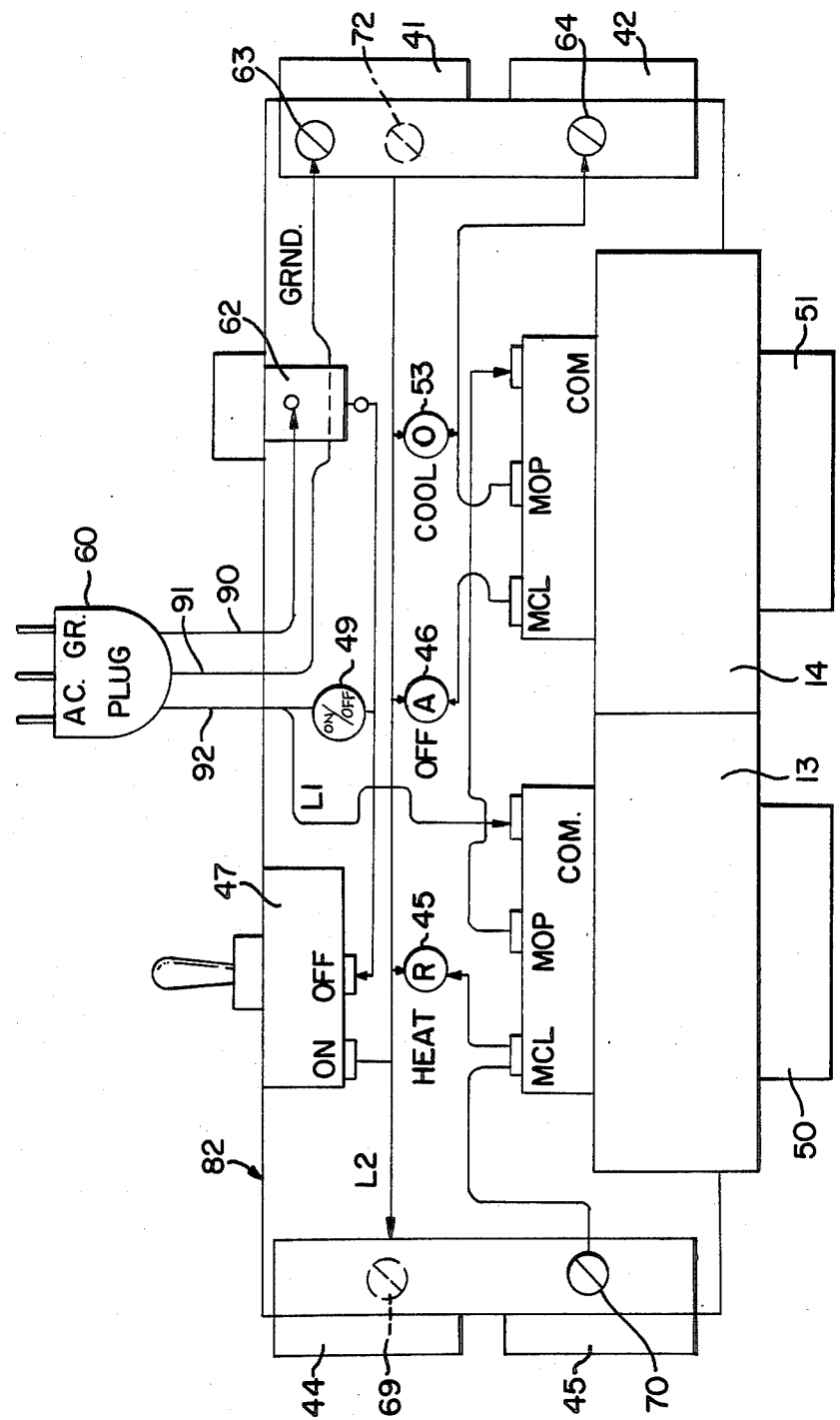
FIG. 4 is an electrical schematic diagram showing the connection between the two thermostats and the various connections necessary to cause the above described operation.

Referring to FIG. 4, there is shown a schematic diagram of an embodiment of dual thermostat controlled outlet structure such as in FIGS. 1, 2 and 3. In FIGS. 1-4, commonly assigned reference numerals indicate common structures. As indicated, an AC power plug 60 is adapted to be plugged into any conventional AC outlet. Normally, an AC power plug as 60 is associated with three wires as indicated in FIG. 4, although a two wire arrangement such as shown in FIG. 2 may be employed.

One wire is a ground wire and designated by reference numeral 91. The ground wire 91 is connected directly to terminal 63 of a terminal board where it is then connected to each of the four AC receptacles as 41-44. The one hot side of the line via wire 90 is directed through a fuse 62 associated with a fuse holder and the out terminal of this wire of the line is wired from the fuse to the center terminal of a typical toggle switch 47.

The ON terminal of the toggle switch is coupled to the OFF terminal of the toggle switch when the lever of the switch is moved. Thus the power line 90 which is connected to the OFF terminal becomes connected to the ON terminal of switch 47 and is thereby directed to each terminal of the AC receptacles as 41-44. The other side of the line which is represented by the line input terminal 92 is directed to the common input terminal of the first thermostat 13. The thermostat 13 as is commercially available contains two additional terminals designated in the diagrams as M CL and M OP. The M OP terminal is normally open while the M CL terminal is normally closed. Both terminals are connected to the common terminal and under control of the thermostat.

As is well known, a thermostat essentially consists of a heat sensitive element which controls switching means. In the type of thermostat described above, the common input terminal will be connected to either the M CL terminal or the M OP terminal depending upon temperature setting and as will be explained subsequently. Thus the side of the line 92 is directed to the common input terminal of the first thermostat unit 13. The M OP terminal of the first thermostat unit 13 is connected to the common terminal of the second thermostat unit 14. The M OP terminal of the unit 14 is connected to terminal 64 of the terminal board whereby connectors 41 and 42 receive power at the third terminal input via the terminal 64 which is, as indicated, connected to the M OP contact of thermostat 14. The M CL contact of thermostat 14 is connected to the load OFF light 46 having its other terminal connected to the ON terminal of the switch 47.

The M OP terminal of thermostat unit 14 is connected to the indicator lamp 53 which has its other side also connected to the ON terminal of switch 47. The M CL contact of thermostat 13 is connected to the heat lamp 45 having its other terminal connected to the ON terminal of switch 47 and is also connected to the terminal board via terminal 70. In this manner, both receptacles 43 and 44 receive a thermostat control input from thermostat 13 via terminal 70, and as will be explained, both receptacles 43 and 44 are operated whereby power is supplied to these receptacles during the heat operation while both receptacles 41 and 42 have power applied to all terminals only during a cooling operation.

Essentially, the circuit functions as follows. When the toggle switch 47 is operated in the ON position, the hot side of the line which emanates from the fuse holder 62 is coupled to terminals 69 and 72. In this manner, the line is now applied to the receptacles 41–44. In any event, line 92 from the AC plug 60 is coupled to the common terminal of thermostat 13. The common terminal of thermostat 13 would be connected to the M CL terminal when the thermostat is set for a specific heating mode. In this manner, terminal 70 is activated and therefore receptacles 43 and 44 would have power applied to all associated terminals. Hence if one plugged in a heater or another unit into receptacles 43 and 44, the heater or other device would operate.

The device would operate until the temperature set by the thermostat was exceeded. In this manner, the common terminal of thermostat 13 would be connected to the M OP terminal. Hence the M OP terminal of thermostat 13 is connected to the common terminal of thermostat 14. The common terminal of thermostat 14 is normally connected to the M CL contact whereby after thermostat 13 has been operated in the mode described above, indicating that the heat or temperature has reached the set level, power is now applied to thermostat 14 and is directed to the common terminal which is normally connected to the M CL terminal.

Therefore, when the temperature is exceeded, the M CL terminal of thermostat 14 is operational. In this manner, the lamp 46 becomes energized. The receptacles 41 and 42 are not in any manner activated due to the fact that the setting of thermostat 14 which controls cooling is not operational. As soon as the temperature begins to rise, it is, of course, understood that thermostat 13 which is in control of heat would not respond and remains in the condition specified.

As soon as the temperature begins to rise as indicated then the thermostat 14 causes the common lead to be connected to the M OP lead as previously described. The M OP lead now applies power to terminal 64 which therefore completes full power to receptacles 41 and 42 at the same time energizing the cooling lamp 53. Hence an air conditioner or fan which will be plugged into terminals 41 and 42 will begin to operate. As soon as, the operation is such that the premises have been cooled to the desired level, the thermostat 14 then transfers operation from the common to the M CL contact, again, lighting the OFF lamp 46.

As soon as the temperature falls below a value which is set via thermostat 13, thermostat 13 causes a connection to be made between the commom M CL contact which again applies power to terminal 70 and causes the heat lamp 45 to come on. The unit operates according to the above described principles, and the user can set the unit as follows. The switch box via plug 60 is plugged into a convenient AC outlet. The thermostat limits on heat and cooling are set. For example, thermostat 13 which is the heating themostat would be set to 70 degrees. This assures that at a setting of 70 degrees and all temperatures below 70 degrees, the common terminal would be connected to the M CL terminal. When the temperature of 70 degrees or greater has been achieved, the common terminal is connected to the M OP terminal.

The cooling thermostat 14, for example, would be set to 76 degrees to cause it to commence operation by connecting the common to the M OP terminal. Once the individual thermostats are set then the power switch 47 is turned to the OFF position. As one can ascertain, a heater would be plugged into receptacles 43 or 44 while an air conditioner or a fan would be plugged into terminals 41 and 42. The power switch 47 is then turned to On, light 49 is illuminated and the unit operates as follows.

When the temperature is below 70 degrees, the heater and the red pilot light 45 are energized and are working during normal operation. When the temperature rises, for example to 72 degrees, the thermostat 13 by connecting the common lead to the M OP lead causes the heater and the pilot light 45 to go Off. The M OP terminal of thermostat 13 is connected to the common terminal of thermostat 14. This is normally connected to the M CL terminal of thermostat 14 causing the lamp 46 to come on. As soon as the temperature increases and reaches 76 degrees, the thermostat 14 causes the common terminal to be connected to the M OP terminal.

In this manner, the lamp 53 is energized as is terminal 64. This causes the air conditioner to activate tending to cool the room down. As soon as the room is cooled below 76 degrees, the lamp 41 is again energized. If the temperature falls below 70 degrees then thermostat 13 causes a connection between the common and the M CL contact thus turning the heater on. In this manner, the temperature of the room is accurately maintained between 70 and 76 degrees while the air is constantly circulated due to such operation and the entire environment of the room can be accurately controlled.

Referring to FIG. 5, there is shown a very simple schematic of a typical thermostat operation. It is of course understood that many different techniques can be employed, and it is clearly indicated that the thermostat units as 13 and 14 are those which are completely commercially available.

In FIG. 5 the temperature sensitive element 100 is a bimetallic spring which is responsive to temperature to expand or contract. Coupled to the bimetallic spring is a mercury switch 101 having the specified contacts as common, M CL, and M OP. As one can see from FIG. 5, during operating conditions, the common contact is connected to the M CL contact. When the spring expands or contracts, the mercury switch 101 tilts making a connection between the common and the M OP contact and these connections are therefore a function of temperature.

By changing the quiescent characteristics of the spring in regard to the coil patterns, one can therefore adjust the unit to be set for predetermined temperatures by means of the controls as 50 and 51 of FIGS. 2 and 4.

Thus the above described unit functions to simultaneously control a heating and air conditioning unit or a heating and cooling device. Based on the settings of the temperature ranges on each device, the temperature of an environment can be held within a narrow extremely range maintaining the environment in a completely comfortable condition.

Thus the dual thermostat controlled outlet unit as described can operate to keep all sorts of environments at a comfortable temperature. This can include machine shops, stores, homes and so on. It can keep rooms smoke and dust free with comfortable temperature control, and various appliances can be plugged into the apparatus to afford such control. It is of course understood that the apparatus can control heat sensitive machinery, walk-in coolers and so on. There are many applications for the above described device which should be apparent to those skilled in the art.

What is claimed is:

1. A thermostat controlled apparatus, comprising:

first and second thermostat units each having separate, independently setable adjustable temperature setting means and each including switching means responsive to said temperature setting means and temperature measured by said thermostat unit to provide a connection between a common terminal and a first terminal for a temperature below a temperature set and between said common terminal and a second terminal for a temperature above said temperature set, said first and second thermostat units being adjusted to selected different temperatures to establish a range of operating conditions, said separate adjustable temperature setting means taking the form of a temperature selection control which may be turned to a selected temperature, includes indicia for indicating the temperature selected and whose operation is unique to said first and second thermostat unit associated therewith;

means for supplying energizing potential to said common terminal at one of said first and second thermostat units;

means for interconnecting said second terminal at said one of said first and second thermostat units to said common terminal at another of said first and second thermostat units;

first means connected to said first terminal at said one of said first and second thermostat units for applying said energizing potential to a first load when temperature measured is below a temperature setting selected at said one of said first and second thermostat units;

second means connected to said second terminal at said another of said first and second thermostat units for applying said energizing potential to a second load where temperature measured is above a temperature setting selected at said another of said first and second thermostat units; and said switching means at said first and second thermostat units and said means for interconnecting acting to prevent energizing potential from being applied to said first and second means when said temperature is intermediate said selected different temperatures, and from being applied to said first and second means at the same time regardless of the temperature, said first and second means taking the form of electrical outlets to which said first and second loads may be connected with standard line cord connectors.

2. The thermostat controlled apparatus according to claim 1, wherein said energizing potential is a source of AC as available from a conventional AC outlet.

3. The thermostat controlled apparatus according to claim 1, wherein said first and second means includes first and second AC female receptacles each adapted to accommodate an AC male powder plug.

4. The thermostat controlled apparatus according to claim 1 further including first indicator means coupled to said first terminal at said one of said first and second thermostat units and operative to provide an indication when said first means is in condition to supply energizing potential to said first load.

5. The thermostat controlled apparatus according to claim 4, further including second indicator means coupled to said second terminal at said another of said first and second thermostat units and operative to provide an indication when said second means is in condition to supply energizing potential to said second load.

6. The apparatus according to claim 5, wherein said first and second indicator means are lamps to provide a visual indication of the condition of said first and second means to supply energizing potential to said first and second loads.

7. The apparatus according to claim 1 further including separate indicator means coupled to said first terminal at said another of said first and second thermostat units to provide an indication when said temperature is intermediate said selected different temperatures.

8. A thermostat controlled apparatus comprising:

a housing having located therein first and second thermostat units, each unit having a separate, independently setable adjustable temperature setting means which is readily accessible to a user and indicia therefor to indicate the temperature set, said separate adjustable temperature setting means each exhibiting operation which is unique to said first and second thermostat unit associated therewith, each unit having a common terminal, a normally open terminal and a normally closed terminal, each thermostat unit establishing a connection between said common terminal and said normally closed terminal for temperatures below said temperature set, and making a connection between said common terminal and said normally open terminal for temperatures above said temperature set, at least first and second female AC receptacles capable of accommodating a male plug mounted in said housing, each receptacle having a first and second terminal, with said first receptacle associated with said first thermostat and said second receptacle associated with said second thermostat, means for applying a two wire source of energizing potential to said housing, said means for applying including means for connecting one wire of said two wire source to the common terminal of said first thermostat and means for connecting the other wire of said two wire source to a first terminal of said at least said first and second female AC receptacles;

means for interconnecting the normally open contact of said first thermostat to the common terminal of said second thermostat, means for connecting the normally closed contact of said first thermostat to the second terminal of said first receptacle, means for connecting the normally open terminal of said second thermostat to the second terminal of said second receptacle, whereby when said first thermostat is adjusted to a first temperature and said second thermostat is adjusted to a second temperature, said first and second receptacles are selectively energized only in an alternative manner and may not be simultaneously energized and neither said first nor second receptacle is energized for a temperature between said adjusted temperatures.

9. The thermostat controlled apparatus according to claim 8, further including a first indicator lamp coupled between said normally closed terminal of said first thermostat and said other wire of said source to provide an indication when said first receptacle is energized by said first thermostat.

10. The thermostat controlled apparatus according to claim 9 further including a second indicator lamp coupled between said normally closed terminal of said second thermostat and said other wire of said source to provide an indication when said second receptacle is energized by said second thermostat.

11. The thermostat controlled apparatus according to claim 10 further including a third indicator lamp coupled between said normally closed contact of said second thermostat and said other wire of said source to provide an indication that neither said first and second receptacles are energized.

12. The thermostat controlled apparatus according to claim 8, wherein said means for applying said two-wire source includes a switch for selectively opening and closing one of said wires to thereby prevent energization of either receptacle.

13. The thermostat controlled apparatus according to claim 8, wherein said first thermostat is set in regard to a given temperature for providing heat with the plug of a heater unit coupled to said first receptacle, and said second thermostat is set for a temperature higher than said given temperature with the plug of an air conditioner coupled to said second receptacle.

14. The thermostat controlled apparatus according to claim 8, wherein the difference in temperature setting between said first and second thermostats is between 4 to 10 degrees.

* * * * *